Figure 1:
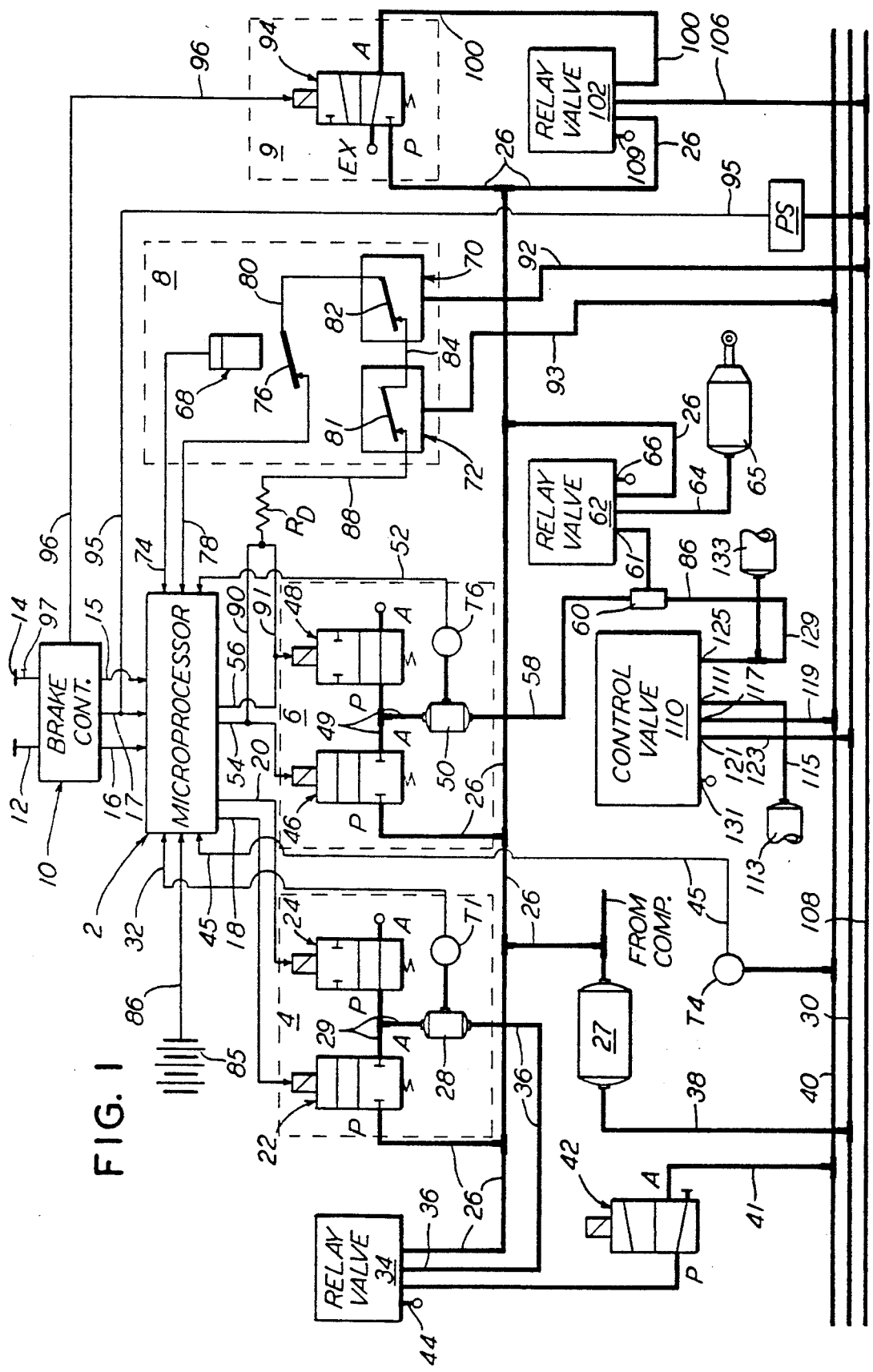

United States Patent [19]
Dimsa et al.

[11] Patent Number: 5,222,788
[45] Date of Patent: Jun. 29, 1993

[54] MICROPROCESSOR BASED ELECTRO-PNEUMATIC LOCOMOTIVE BRAKE CONTROL SYSTEM HAVING BRAKE ASSURANCE CIRCUIT

[75] Inventors: Robert D. Dimsa, Elizabeth; Robert J. Jenets, North Huntingdon, both of Pa.

[73] Assignee: Westinghouse Air Brake Company, Wilmerding, Pa.

[21] Appl. No.: 760,539

[22] Filed: Sep. 16, 1991

[51] Int. Cl.⁵ .............................................. B60T 15/14
[52] U.S. Cl. ........................................ 303/15; 303/20
[58] Field of Search ................ 303/3, 15, 16, 17, 18, 303/20

[56] References Cited

U.S. PATENT DOCUMENTS

| | | | |
|---|---|---|---|
| 3,583,771 | 6/1971 | Dressler, Jr. | 303/20 |
| 3,799,623 | 3/1974 | Wickham et al. | 303/20 |
| 3,901,558 | 8/1975 | Burkett | 303/20 |
| 5,090,780 | 2/1992 | Powell | 303/20 |

Primary Examiner—Matthew C. Graham
Attorney, Agent, or Firm—G. J. Falce

[57] ABSTRACT

A microprocessor based, electro-pneumatic brake control system for a locomotive including electro-pneumatic valves operated by a microprocessor for controlling the locomotive brake pressure in parallel with a pneumatic back-up control valve that includes a quick release valve to bail off the locomotive brake. A brake assurance circuit is provided to apply the locomotive brakes through the electro-pneumatic valves in bypass of the microprocessor when a loss of electrical power at the microprocessor occurs.

15 Claims, 2 Drawing Sheets

MICROPROCESSOR BASED ELECTRO-PNEUMATIC LOCOMOTIVE BRAKE CONTROL SYSTEM HAVING BRAKE ASSURANCE CIRCUIT

BACKGROUND OF THE INVENTION

The present invention relates to microprocessor based electro-pneumatic type locomotive brake control systems and particularly to a brake assurance circuit for such a locomotive brake control system.

Modern-day locomotive controls, including the locomotive brake control system, incorporate computer technology to reduce hardware and to facilitate adaptation of the system to various customer requirements.

In one such brake control system, a cab-mounted, a handle-operated, brake controller outputs a desired brake command signal to a microprocessor unit, which interprets this brake command signal in terms of a feedback signal indicative of the pressure of air in an equalizing reservoir, and then effects operation of application and release electro-magnetic valves to adjust the equalizing reservoir pressure in accordance with the brake command signal.

A high-capacity pneumatic relay valve device is employed to vary the trainline brake pipe pressure in accordance with variations of the equalizing reservoir pressure, in order to control the railway car brakes. This so-called brake pipe control circuit of the aforementioned brake control system is shown and described in U.S. Pat. No. 4,904,027, which is incorporated herein by reference.

The brake control system further includes a locomotive brake cylinder control circuit having electro-pneumatic application and release valves. The locomotive brake cylinder control electro-pneumatic valves are operated by the microprocessor in response to changes in brake pipe pressure initiated by the brake pipe control circuit in accordance with movement of an automatic brake handle of the cab brake controller. Another high-capacity pneumatic relay valve device regulates the pressure in the locomotive brake cylinders according to the pressure output of the locomotive brake cylinder control circuit application and release electro-pneumatic valves.

The electro-pneumatic valves in the brake pipe control circuit and in the locomotive brake cylinder control circuit are arranged to assume a pressure release state, in the event of a power loss at the microprocessor unit. In consequence of such a power loss, therefore, brake pipe pressure is reduced while, concurrently, the locomotive brake cylinder pressure is released. A pneumatic backup control valve in the locomotive automatic brake control circuit is provided to establish locomotive brake cylinder pressure in response to the aforementioned reduction of brake pipe pressure resulting from such fail-safe operation of the electro-pneumatic valves in the brake pipe control circuit, there being a double check valve to separate the pneumatic backup control valve from the electro-pneumatic valves in the locomotive brake cylinder control circuit.

The pneumatic backup control valve includes a piston valve assembly subject on opposite sides to compressed air in the brake pipe and in a control reservoir. When brake pipe pressure is reduced, the resultant pressure differential forces the piston valve assembly to application position, wherein the control reservoir air supplies the brake cylinder pilot line to establish the locomotive brake pressure until a force balance is restored across the piston valve assembly. In this manner, the piston valve assembly seeks a lap position in which the supply of brake cylinder pressure is terminated at a value corresponding to the brake pipe pressure reduction in effect.

This locomotive brake cylinder pressure may be released independently of the car brakes by means of a quick release valve associated with the pneumatic backup control valve. A pressure signal supplied to the quick release valve, when a quick release switch is actuated, initiates this "bail-off" or quick release function. The brake pipe/control reservoir pressures are communicated via the quick release valve to establish pressure equalization across the piston valve assembly, when the quick release switch is actuated. In this manner, the control reservoir pressure is effectively equalized with the reduced brake pipe pressure, such that spring force acting on the piston valve assembly is effective to force the piston valve assembly to release position and the locomotive brake cylinder pressure is exhausted.

In order to reapply the brake, the quick release switch is deactuated to interrupt communication between the brake pipe and control reservoir pressures via the quick release valve, so that a subsequent reduction of brake pipe pressure is effective to produce a further pressure differential across the piston valve assembly. In response to this further pressure differential, the piston valve assembly will return to application position and reestablish the supply of control reservoir pressure to the brake cylinder pilot line to reapply the locomotive brake.

As previously mentioned, however, brake pipe pressure is reduced to zero in response to a power outage at the microprocessor, due to the fail-safe configuration of the electro-pneumatic valves in the brake pipe control circuit. Following a quick release maneuver, in response to which the locomotive brake cylinder pressure is released, no further reapplication of the brakes can be obtained via the pneumatic backup control valve since brake pipe pressure is essentially zero. It will be appreciated, therefore, that with the electro-pneumatic valves in the locomotive brake cylinder control circuit arranged to release locomotive brake pressure during a microprocessor power failure, and the pneumatic backup control valve disabled, as explained, during a microprocessor power failure, a situation exists in which the train can be moving without the ability to obtain any locomotive braking whatsoever.

SUMMARY OF THE INVENTION

The object of the present invention is to provide a means of reapplying the locomotive brake following quick release or "bail-off" of a pneumatic back-up brake application on the locomotive resulting from a loss of power at the computer of the microprocessor based electro-pneumatic control.

Briefly, these objectives are carried out by a microprocessor based, electro-pneumatic brake control system comprising a brake controller having a handle for generating a brake command signal, first electro-pneumatic valve means for controlling the pressure of a brake pipe, second electro-pneumatic means for controlling locomotive brake cylinder pressure, microprocessor means having a regulated source of electric power for controlling the first electro-pneumatic valve means in accordance with the brake command signal and for controlling the second electro-pneumatic valve means in accordance with changes in the brake pipe pressure, the second electro-pneumatic valve means being arranged to supply the locomotive brake cylinder pressure in an energized condition thereof and to release the locomotive cylinder brake pressure in a de-energized condition thereof, and brake assurance means for establishing an energized condition of the second electro-pneumatic valve means in response to loss of the regulated source of electric power.

Figure 2:
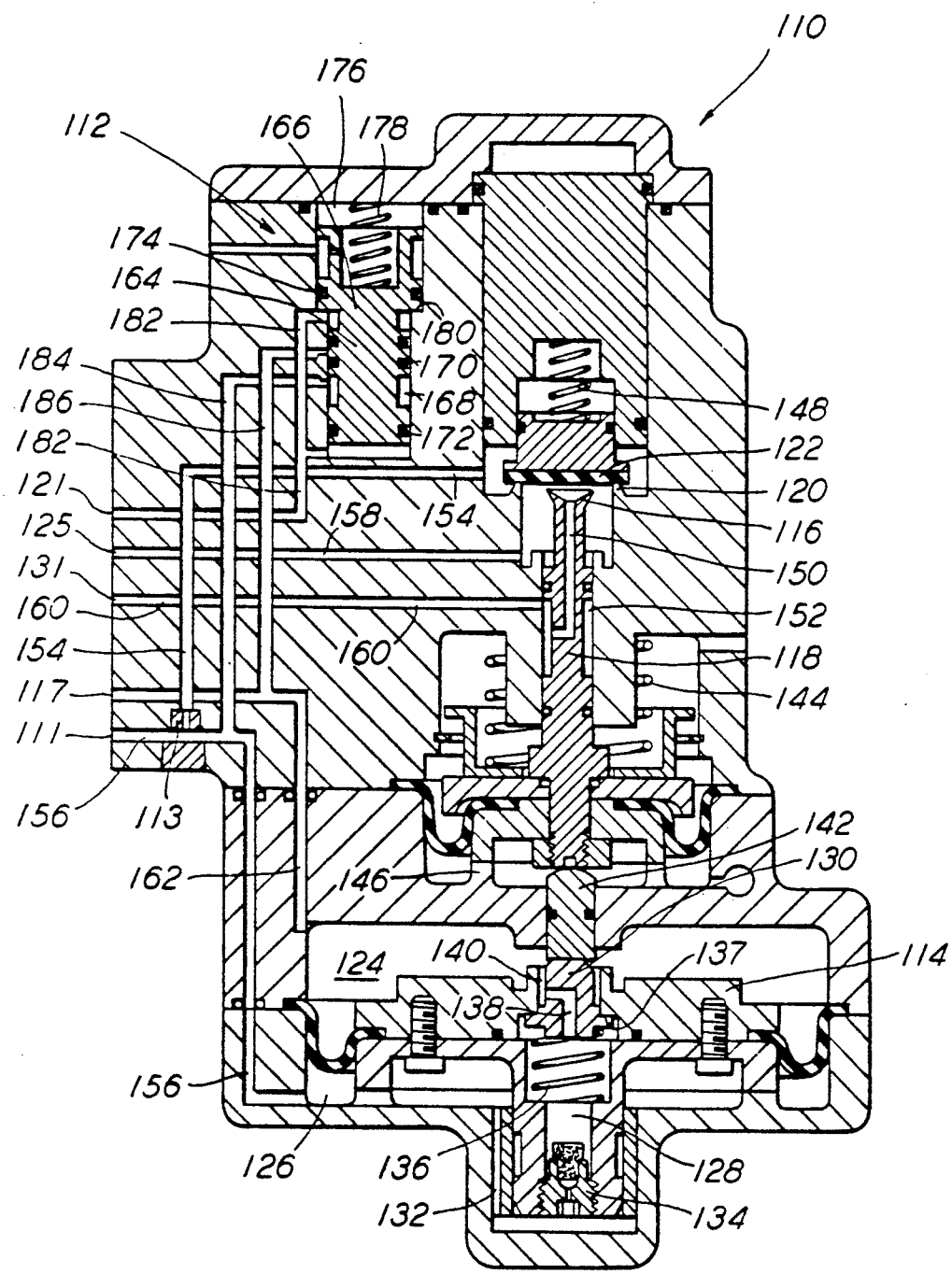

These and other objects and advantages of the invention will become apparent from the following more detailed explanation when taken in conjunction with the accompanying drawings in which:

FIG. 1 is a block diagrammatic of a microprocessor based, electro-pneumatic brake control system including a brake assurance circuit with which the present invention is concerned; and FIG. 2 is a sectional assembly view of the pneumatic back-up control valve device employed in the brake control system of FIG. 1.

DESCRIPTION OF THE INVENTION

Referring to FIG. 1 of the drawings, there is shown a locomotive electro-pneumatic brake control system having a microprocessor 2 that controls a brake pipe pressure control circuit 4, a locomotive brake cylinder control circuit 6, a brake assurance circuit 8, and a quick release circuit 9. Microprocessor 2 receives input signals from a cab brake controller 10 having an automatic brake control handle 12 and an independent brake control handle 14.

Manual operation of automatic brake control handle 12 to one of a plurality of discrete selected positions between brake release and full service positions establishes a level of brake pipe pressure corresponding to brake release and a desired level of application. The incremental handle position selected is converted into a corresponding electrical brake command signal by a suitable encoder, or the like, which is fed to microprocessor 2 via line 16. Microprocessor 2 responds to this brake command signal and generates a regulated 24-volt output signal at wires 18, 20 via which the solenoid operators of two-way, spring returned charging and release electro-magnetic valves 22, 24 are actuated. Charging valve 22 is normally closed and release valve 24 is normally open, the inlet P of charging valve 22 being connected by a pipe 26 to a main reservoir 27 to which air is supplied from a compressor (not shown), and the outlet A of release valve 24 being connected to atmosphere. Main reservoir 27 is connected by a pipe 38 to a main reservoir equalizing pipe 30 that is interconnected between the units of a locomotive consist. A control reservoir 28 is connected to a pipe 29 via which outlet A of charging valve 22 is connected to inlet P of release valve 24. A pressure transducer T1 monitors the pressure in control reservoir 28 and transmits a corresponding feedback signal to microprocessor 2 via wire 32.

The control port of a high capacity pneumatic relay valve 34 is connected by a pipe 36 to control reservoir 28. Relay valve 34 may be a conventional, well-known C-2 type relay valve typically employed in the 26 type locomotive brake valves and also in the 30-CW module manufactured by the Westinghouse Air Brake Company. Relay valve 34 further includes a supply port that is connected by pipe 26 to main reservoir 27, a delivery port that is connected by a pipe 41 to brake pipe 40, and an exhaust port 44 that is connected to atmosphere. An electro-pneumatic bi-stable, magnetically latched valve 42 is provided in pipe 41 having a closed position in which its inlet P is cut off from outlet A, and an open position in which inlet A is communicated with outlet P. Cutout valve 42 is open on lead units to establish communication between brake pipe 40 and relay valve 34 and closed on trail units to interrupt such communication. Relay valve 34 operates to vary the pressure in train brake pipe 40 in accordance with the pressure in control reservoir 28, supplying air from main reservoir 27 to pipe 41 or releasing air from brake pipe 40 via pipe 41 and exhaust port 44. The train brake pipe 40 carries compressed air to the cars in the train, the brakes of which are controlled in accordance with variation of such brake pipe pressure in a well-known manner.

The locomotive brake cylinder control circuit 6 is controlled in accordance with the brake pipe pressure, as monitored by a transducer T4, which transmits a corresponding electrical feedback signal via wire 45 to microprocessor 2. This permits the microprocessor to establish the locomotive brake cylinder pressure.

Locomotive automatic brake control circuit 6 consists of a normally closed, two-way, spring returned, electro-pneumatic application valve 46, a normally open, two-way, spring returned, electro-pneumatic release valve 48, a control reservoir 50 and a pressure transducer T6. Inlet P of application valve 46 is connected via pipe 26 to main reservoir 27, while outlet A of release valve 48 is connected to atmosphere. Reservoir 50 is interconnected between outlet A of application valve 46 and inlet P of release valve 48 via a pipe 49. Transducer T6 instantaneously monitors the pressure in reservoir 50 and transmits a corresponding electrical feedback signal to microprocessor 2 via wire 52. The solenoid operators of the respective application and release valves 46, 48 are connected by wires 54, 56 to microprocessor 2, which is capable of supplying 24 volts to these control wires under normal operating conditions. The pressure in control reservoir 50 is regulated by these electro-pneumatic application and release valves in inverse relationship and at a predetermined ratio relative to brake pipe pressure changes. Reservoir 50 is connected by a pipe 58 to one inlet of a double check valve 60, the outlet of which is connected by a pipe 61 to the control port of a high capacity pneumatic relay valve 62. This relay valve 62 may be a well-known, standard J-type relay valve device manufactured by the Westinghouse Air Brake Company, further having a supply port that is connected by pipe 26 to main reservoir 27, a delivery port that is connected by a pipe 64 to the locomotive brake cylinder device 65, and an exhaust port 66 that is connected to atmosphere. Relay valve 62 provides the required high capacity to supply compressed air from main reservoir pipe 26 to brake cylinder device 65, and to release brake cylinder pressure via exhaust port 66, in accordance with the pressure level established in reservoir 50.

Brake assurance circuit 8 comprises a loss of power relay 68, a quick release pressure switch 70, and a brake pipe pressure switch 72. Relay 68 is supplied with voltage from a battery 85 via a wire 86, a voltage regulator circuit (not shown) associated with microprocessor 2, and a wire 74. Relay 68 has a normally closed switch 76, the contact of which is supplied with voltage directly from battery 85 at approximately 72 volts via wire 86 and a wire 78. Switch 76 is connected by a wire 80 to the contact of a normally closed switch 82 of quick release pressure switch 70, which is in turn connected by a wire 84 to a normally closed switch 87 of brake pipe pressure switch 72. The contact of switch 87 is connected by a wire 88 to a dropping resistor $R_D$, which reduces the 72-volt battery power to approximately 24 volts. Resistor $R_D$ is connected by parallel wires 90, 91 to the respective electro-pneumatic valves 46, 48 of locomotive automatic brake control circuit 6. The quick release pressure switch 70 is connected by a pipe 92 to an actuating pipe 108 and brake pipe pressure switch 72 is connected by a pipe 93 to brake pipe 40. The contact 87 of brake pipe pressure switch 72 is set to close when the pressure in brake pipe 40 is below approximately 15 psi.

Quick release control circuit 9 includes a solenoid operated, spring returned, three-way, electro-pneumatic quick release valve 94, the solenoid of which is connected by a wire 96 to cab brake controller 10 to provide a quick release signal when a manually operable, quick release switch 97 is actuated. Preferably, this quick release switch is incorporated in independent handle 14 in such a way as to permit the operator to actuate the quick release switch, while at the same time manipulating the handle for independent brake control.

Quick release valve 94 includes an inlet P that is connected by a pipe 26 to main reservoir 27, an outlet EX that is connected to atmosphere, and an outlet A that is connected by a pipe 100 to the control port of a high capacity pneumatic relay valve 102. This relay valve 102 further includes a supply port to which main reservoir 27 is connected by pipe 26, a delivery port connected by a pipe 106 to actuating pipe 108, and an exhaust port 109 connected to atmosphere. Relay valve 102 may also be a well-known, S-type relay valve device, and is provided to handle the high capacity air requirement of actuating pipe 108, which runs through the locomotive consist.

Associated with quick release circuit 9 is a pressure switch PS that is connected to actuating pipe 108 in order to provide an electrical signal to microprocessor 2 via a wire 95 indicative of a quick release operation being initiated on a lead locomotive. This signal provides the means by which a trailing locomotive automatic brake application may be quick released in conjunction with release of the lead locomotive automatic brake application when the quick release switch 97 is actuated on the lead locomotive.

In FIG. 1, the locomotive brake cylinder control circuit 6 is further provided with a pneumatic back-up automatic brake control valve 110. This brake control valve 110 is a basic MC-30C type control valve device that is modified to replace the usual emergency valve feature thereof with a quick release pilot valve 112, shown in FIG. 2, in accordance with the present invention, as hereinafter explained. The MC-30C control valve is well known in the railroad braking industry, being manufactured by the Westinghouse Air Brake Company, and shown and described in Operation and Maintenance brochure 4220-5, published by the Westinghouse Air Brake Company.

As shown in FIG. 1 of the drawings, brake control valve 110 includes a supply port 111 to which an auxiliary reservoir 113 is connected via a pipe 115, a control port 117 to which brake pipe 40 is connected via a pipe 119, a quick release port 121 to which actuating pipe 108 is connected via a pipe 123, a delivery port 125 connected to a a double check valve 60 by a pipe 129, and an exhaust port 131 that is connected to atmosphere. Connected to pipe 129 is a displacement reservoir 133 that simulates the brake cylinder displacement volume to assure operation of control valve 110 to obtain the proper brake cylinder pressure development.

Referring to FIG. 2 of the drawings, the brake control valve 110 further includes, in addition to quick release valve 112, a piston valve assembly comprising a diaphragm type control piston 114, an exhaust valve seat 116 at one end of a piston stem 118, a supply valve seat 120 formed on the valve body in surrounding relationship with exhaust valve seat 116, and a valve element 122 with which the supply valve and exhasut valve seats are engageable.

Control piston 114 cooperates with the valve body to form a control chamber 124 on one side and a reference chamber 126 on the opposite side. Carried in a central cavity 128 of piston 114, so as to have limited axial movement relative thereto, is a charging and dissipation valve 130. A passage 132 between chamber 126 and cavity 128 is provided with a charging and dissipation choke 134. A relatively light spring 136 biases charging and dissipation valve 130 to its upper-most position against a stop shoulder 137 as viewed in the drawing, while another passage 138 in charging and dissipation valve 130 establishes communication between cavity 128 and control chamber 124 via an annular groove 140.

A pusher pin 142 is carried in the valve body, one end being engageable with charging and dissipation valve 130 and the other end with the end of piston stem 118 opposite exhaust valve seat 116. Another spring 144 that is stronger than spring 136 biases stem 118 in a downward direction toward engagement with a stop 146. In this release and charging position, as shown in the drawing, exhaust valve seat 116 is displaced from valve element 122, which is forced by a light spring 148 into engagement with supply valve seat 120. A central passage 150 in stem 118 is connected between an annular groove 152 in stem 118 and the end of stem 118 having exhaust valve seat 116. A passage 154 connects the area surrounding supply valve seat 120 with supply port 111 via a control choke 113, and a branch 156 of passage 154 is connected to reference chamber 126. Another passage 158 connects the area within the bounds of supply valve seat 120 with delivery port 125; a passage 160 connects the annular groove 152 to exhaust port 131; and a passage 162 connects chamber 124 to control port 117.

Quick release pilot valve 112 is comprised of a piston spool valve member 164 having a head portion 166 forming a piston and an annular groove 168 on the opposite sides of which are disposed O-ring seals 170, 172. Another O-ring seal 174 separates the underside of head portion 166 from a vented chamber 176 on the opposite side in which a bias spring 178 is disposed to urge the piston and spool member toward engagement with a stop shoulder 180 formed on the control valve body, in a deactuated position of the quick release valve.

A passage 182 is connected between quick release control port 121 and the underside of spool member 164 and bead portion 166, a branch passage 184 is connected between passage 156 and spool member 164, such as to remain in communication with spool groove 168 in both the actuated and deactuated positions of quick release valve 112, and a branch passage 186 is connected between passage 162 and spool member 164 at a location axially spaced from spool groove 168 such a distance as to be uncovered by the spool groove in the deactuated position of the quick release valve.

Initial Charging

Prior to initial charging, i.e., prior to power being supplied from brake controller 10 to wire 17 leading to microprocessor 2, the electro-magnetic valves in the respective brake control circuits 4, 6, and 9 are de-energized, and accordingly assume a normal position, as shown, under the influence of their return springs. Consequently, control reservoir 28 is vented to atmosphere via outlet A of release valve 24.

When power is subsequently turned on and handle 12 is moved to release position to initiate charging, a difference exists between the brake command signal transmitted to microprocessor 2 via wire 16, in accordance with handle 12 of brake controller 10 being in release position, and the feedback signal transmitted from transducer T1 to microprocessor 2 via wire 32, indicative of the pressure level of control reservoir 28. The polarity of this signal difference causes microprocessor 2 to energize electro-magnetic charging and release valves 22, 24, of the brake pipe control circuit 4, thereby causing these valves to be shifted from their normal de-energized positions represented by the connections shown in the lower valve envelope to the position represented in the upper valve envelope. Consequently, compressed air is connected from main reservoir 27 to control volume 28 via pipe 26, ports P and A of charging valve 22 and pipe 29, this pressure in pipe 29 being cut off from atmosphere at port P of release valve 24.

When the pressure in control reservoir 28 corresponds substantially to the brake command signal at wire 16, microprocessor 2 de-energizes charging valve 22, while maintaining release valve 24 energized. This establishes a lap condition in which further supply and release of control reservoir 28 pressure is terminated, it being understood that as the control reservoir pressure approaches the command pressure, charging valve 22 is controlled in accordance with the referencing Patent in order to prevent overshoot and consequent valve cycling.

This control reservoir pressure is in turn connected via pipe 36 to relay valve 34, which in turn supplies air from main reservoir 27 to brake pipe 40 via pipes 26 and 41. In this manner, the train brake pipe pressure is charged to a predetermined running pressure, which can be adjusted at microprocessor 2, as desired.

Brake pipe pressure is concurrently supplied via pipe 119 and supply port 117 of control valve 110 to control chamber 124 thereof, as shown in FIG. 2. As the brake pipe pressure increases, piston 114 is forced to its downwardmost position, as shown, in which spring 136 is effective to force charging and dissipation valve 130 into engagement with stop shoulder 137. In this position, charging and dissipation valve 130 opens a charging port via annular groove 140 and central passage 128 through which reference chamber 126 and reservoir 113 are charged to the pressure in brake pipe 40 and control chamber 124. In this downwardmost position of piston 114, spring 144 is effective to force stem 118 into engagement with its stop 146, thereby causing exhaust valve seat 116 to pull away from valve element 122, which is in turn forced by its spring 148 to engage the supply valve seat 120. Brake cylinder control pressure in pipe 129 and displacement reservoir 133 is thus vented via delivery port 125, passage 158, the open exhaust valve, central passage 150, annular groove 152 in stem 118, passage 160 and exhaust port 131.

Further, during charging of brake pipe 40, transducer T4 transmits a feedback signal to microprocessor 2 via wire 45. Until the charging brake pipe pressure builds up to a value corresponding to the brake command signal transmitted to microprocessor 2 via wire 16 in full release position of handle 12, i.e., the desired running or charge pressure of the train, application and release valves 46, 48 of locomotive automatic brake control circuit 6 remain deenergized, as shown. In this deenergized condition, application valve 46 interrupts the supply of main reservoir air to control reservoir 50 by disconnecting its inlet and outlet ports P, A, and release valve 48 connects control reservoir 50 to atmosphere via pipe 47 and its connected inlet and outlet ports P, A.

It will be appreciated from the foregoing that control pipe 61 of relay valve 62 is vented via double check valve 60 and either pipe 58 leading to the vented control reservoir 50 or pipe 129 leading to control valve 110. Brake cylinder 65 is accordingly vented via exhaust port 66 to maintain the locomotive brakes released during this charging of the brake pipe.

Application of Automatic Train Brakes

Following charging of brake pipe 40, a brake application may be initiated on the locomotive consist and the cars of the train by movement of automatic handle 12 out of release position into the service application zone on the lead or controlling locomotive. The handle position is encoded and fed to microprocessor 2 via wire 16. The polarity of the difference between the electrical brake command signal at wire 16 and the electrical feedback signal at wire 32 causes microprocessor 2 to de-energize wire 20 while also maintaining wire 18 de-energized. Charging valve 22 thus continues to interrupt the supply of main reservoir pressure at inlet P thereof, while release valve 24 transitions to the position shown, in which its inlet P is connected to outlet A. The pressure in control reservoir 28 is thus released to atmosphere via pipe 29 and release valve 24 until the signals at wires 16 and 32 substantially correspond. When this occurs, microprocessor 2 causes wire 18 to remain de-energized, while energizing wire 20. Consequently, both the charging valve 22 and the release valve 24 assume a closed state in which no further change in control reservoir pressure occurs.

The resultant reduction of control reservoir pressure is reflected at the control port of relay valve 34, which, in turn, operates to vent brake pipe 40 via branch pipe 41 at the lead or controlling locomotive unit and the exhaust port 44 of relay valve 34. Pressure in the trainline brake pipe 40 is thus reduced in accordance with the pressure reduction of control reservoir 28 to cause a brake application on the cars of the train in accordance with the selected position of the cab brake controller automatic handle 12 in the service brake zone.

Application of Locomotive Automatic Brake

Concurrently, an electrical feedback signal is transmitted to microprocessor 2 at both the lead and trail locomotive via transducer T4 and wire 45 corresponding to the instantaneous pressure in brake pipe 40. Since this brake pipe feedback signal at wire 45 is less than the encoded brake command signal at wire 16 following initial charging, microprocessor 2 activates the locomotive brake cylinder control circuit 6, by energizing application valve 46 and release valve 48 via wires 54 and 56. Application valve 46 is shifted to its open position, in which inlet P is connected to outlet A, while release valve 48 is shifted to its closed position, in which outlet A is cut off from inlet P. Main reservoir pressure is thus supplied to control reservoir 50 via pipe 26, application valve 46, and pipe 49, until such time as the electrical feedback signal from transducer T6 to microprocessor 2 via wire 52 increases in proportion to the brake pipe pressure reduction in effect. It will be appreciated that microprocessor 2 establishes this control of the application and release valves 46, 48 of locomotive automatic brake control circuit 6, such that the pressure of control reservoir 50 varies inversely with the brake pipe pressure reduction in a ratio of approximately 2.5:1.

The resultant pressure developed in control reservoir 50 is connected to the control port of relay valve 62 via pipe 58, double check valve 60 and pipe 61. Relay valve 62, in turn, operates to supply air from main reservoir 27 to brake cylinder 65 via pipe 26 and delivery pipe 64. In this manner, the lead and trail locomotive brake pressure that is controlled by the respective brake control circuit 6 is consistent with the train brakes under control of the lead locomotive brake pipe control circuit 4.

Application of Locomotive Pneumatic Back-Up Brake

Pneumatic control valve device 110 provides a backup pneumatic automatic locomotive brake, operating in parallel with automatic brake control circuit 6, in response to variations in brake pipe pressure. Referring to FIG. 2, a reduction of brake pipe pressure as explained relative to applying the car brakes throughout the train, is reflected at control chamber 124 of control valve 110. Due to charging choke 134, the pressure in reference chamber 126 is prevented from following the pressure drop in chamber 124, so that a pressure differential is established therebetween. The resultant initial upward movement of piston 14 causes charging and dissipation valve 130 to interrupt the pressure communication between chambers 124 and 126, thereby encouraging positive upward movement of piston 114 to application position. Exhaust valve seat 116 engages valve element 122 and displaces the valve element from supply valve seat 120 in response to movement of piston 114 and thus stem 118 to application position. Auxiliary reservoir 113 pressure is thus connected to displacement reservoir 133 and double check valve 60 via pipe 115, supply port 111, control valve passage 156, application choke 113, passage 154, the open supply valve, passage 158, delivery port 125, and pipe 129. Due to the delay imposed by choke 113, the pressure in pipe 58 under control of automatic brake control circuit 6 reaches double check valve 60 before the pressure in pipe 129, thus holding the pneumatic back-up control valve pressure in abeyance pending failure of the automatic brake control circuit, due to a microprocessor malfunction, for example, as will be hereinafter explained.

When the auxiliary reservoir pressure effective in reference chamber 126 is reduced substantially to the pressure in control chamber 124, by volumetric equalization with displacement reservoir 133, spring 144 forces stem 118 and piston 114 in a downward direction until valve element 122 engages supply valve seat 120 to terminate further charging of displacement volume 133 and the piston valve assembly is stablilized in this lap position.

Microprocessor Malfunction on Lead Locomotive

In the event of a malfunction that would render the lead locomotive microprocessor 2 incapable of providing power to operate the respective electro-pneumatic valves heretofore discussed, the lead locomotive and train brakes will be applied automatically in response to the electro-pneumatic valves 22, 24 in brake pipe control circuit 4 assuming a de-energized condition, as shown in FIG. 1. Therefore, irrespective of the position of brake controller handles 12, 14, such loss of power causes control reservoir 28 to be exhausted via release valve 24. Relay valve 34, in turn, is operated to exhaust brake pipe pressure past open cutout valve 42 to accordingly initiate a brake application on the cars of the train in the usual, well-known manner.

This reduction of brake pipe pressure at the lead locomotive concurrently effects operation of pneumatic back-up control valve 110, as previously explained, at the lead and trail locomotives to effect a brake application via relay valve 62. Whereas this back-up pneumatic brake control is withheld under normal power conditions, by reason of the locomotive cylinder brake control circuit 6 having precedence, as explained, de-energization of electro-pneumatic valves 46, 48, due to the power loss at microprocessor 2, causes control reservoir 50 to be vented so that no pressure is supplied to double check valve 60 via pipe 58. Consequently, control of the locomotive automatic brake is established via pipe 129 leading to the other side of double check valve 60 at the lead and trailing locomotives to apply the brakes on the lead and trail locomotives.

At the same time, the effective reduction of brake pipe pressure causes the train brakes to apply at each car and/or locomotive not so electronically equipped in the usual, well-known manner to bring the train to a safe halt.

Microprocessor Malfunction on Trail Locomotive

No brake application will occur in the event a trailing locomotive microprocessor should experience a malfunction, due to which the respective electro-pneumatic valves 22, 24 in brake pipe control circuit 4 are without power. Since cutout valve 42 is closed on the trail locomotive, any pressure reduction provided by relay valve 34 is isolated from brake pipe 40, thereby rendering the trail unit pneumatic back-up control valve 110 unresponsive to fail-safe operation of electro-pneumatic valves 22, 24 in brake pipe control circuit 4. Also, since electro-pneumatic valves 46, 48 are not arranged in a fail-safe brake configuration, i.e., valve 48 venting reservoir 50, it will be appreciated that no brake will be obtained through the trail locomotive brake cylinder control circuit 6, due to this trail locomotive microprocessor power failure. Accordingly, the danger of an unrecognized brake application existing on a trailing locomotive is eliminated. However, back-up control valve 110 remains available to furnish an automatic brake application, if so desired, on the trail unit when so commanded by brake pipe reduction initiated from the lead or controlling locomotive in the consist.

Quick Release of Locomotive Automatic Brake

The locomotive automatic brake may be released independently of the train brakes from the lead or controlling locomotive by actuating quick release switch 97 on independent handle 14 of brake controller 10.

In the case where a brake application is in effect under normal microprocessor operating conditions, brake cylinder control circuit 6 takes precedence over back-up pneumatic control valve 110 in establishing the locomotive brake pressure, as previously explained. Actuating quick release switch 97 on the lead or controlling locomotive connects power to the solenoid of quick release electro-pneumatic valve 94.

Concurrently, power is supplied to microprocessor 2 via wire 17 to cause microprocessor 2 to de-energize electro-pneumatic valves 46, 48. Also, loss of power relay 68 in brake assurance circuit 8 is energized via wire 74 to hold open switch 76 and thereby interrupt the supply of power to electro-pneumatic valves 46, 48 via wires 90, 91. In this de-energized condition, as shown, electro-pneumatic release valve 48 exhausts the brake control pressure in pipe 58 at the lead or controlling locomotive, as well as on any similarly equipped locomotive.

Quick release electro-pneumatic valve 94, FIG. 1, when energized, is shifted from the position shown to the position represented in the upper valve envelope, in which position, port A is disconnected from atmosphere at port EX and is, in turn, connected to port P. Consequently, air is connected from main reservoir 27 to the control port of relay valve 102 via pipe 26, quick release valve 94, and pipe 100. Relay valve 102 is thence operated to connect main reservoir air from pipe 26 to quick release port 121 of back-up control valve 110 via pipe 106 and actuating pipe 108.

As can be seen in FIG. 2, the pressure at quick release port 121 is connected by passage 182 to the underside of quick release valve spool member 164 and piston head 166, thereby actuating quick release valve 112 to its application position in opposition to spring 178. In this application position, O-ring 170 is shifted to the side of passage 186 opposite the side shown, so that passages 184 and 186 are interconnected via spool groove 168. Consequently, reference chamber 126 is placed in communication with control chamber 124 via interconnected passages 184 and 186 to allow the slightly higher pressure in control chamber 124 to equalize with the lower pressure in chamber 126. This upsets the force balance on piston 114, whereby spring 144 is effective to force stem 118 further downward from a lap position, in which the piston valve assembly is assumed to be, to a release position in which the lower end of stem 118 is engaged with stop 146. In this release position, the upper end of stem 118 having exhaust valve seat 116 is pulled away from valve element 122, which remains engaged with supply valve seat 120. Accordingly, the air in pipe 129 and displacement reservoir 133 is vented to atmosphere via delivery port 125 of control valve 110, passage 158, the unseated exhaust valve, central passage 150 in stem 118, passage 160 and exhaust port 131.

With the release of air from control reservoir 50 and displacement reservoir 133, the control pressure at the control port of relay valve 62 is also released via pipe 61, double check valve 60 and pipe 58. Relay valve 62, therefore, is effective to release air from brake cylinder 65 via pipe 64 and the relay valve exhaust port 66, thus effecting a quick release of the lead locomotive brakes.

At the trailing locomotive, pressurization of actuating pipe 108 operates the quick release valve 112 of control valve 110 to exhaust pipe 129 and displacement reservoir 133, as explained relative to the lead locomotive. Concurrently, pressurization of actuating pipe 108 actuates pressure switch PS, which transmits the quick release signal to microprocessor 2 via wire 95, this quick release signal at wire 95 of the trail locomotive corresponding to the quick release signal initiated when quick release switch 97 and subsequently pressure switch PS is actuated on the lead locomotive, to eventually de-energize electro-pneumatic valves 46, 48 and thereby exhaust pressure from pipe 58. In consequence of this exhaust of pressure in pipes 58 and 129 at the trailing locomotive, the trailing locomotive brake cylinder 65 is exhausted, as explained relative to the lead or controlling locomotive.

Brake Reapplication Following Quick Release

Under normal operating conditions, deactuation of quick release switch 97 removes the signal to microprocessor 2 via wire 17 and concurrently effects de-energization of quick release valve 94. In consequence of wire 17 being de-energized, electro-pneumatic valves 46, 48 are energized by microprocessor 2 to pilot relay valve 62 and thereby reapply the brakes in accordance with the selected position of brake controller handle 12. At the same time, de-energization of quick release valve 94 vents actuating pipe 108 to remove the quick release signal at wire 95 and to concurrently allow quick release pilot valve 112 of back-up control valve device 110 to reset, thereby conditioning back-up control valve device 110 to provide brake control pressure in response to a subsequent loss of power at microprocessor 2.

In the event a loss of power already exists at microprocessor 2, however, deactuation of quick release switch 97 is ineffective in causing microprocessor 2 to energize electro-pneumatic valves 46, 48. However, this loss of power at microprocessor 2 causes relay 68 to be de-energized, such that its normally closed switch 76 supplies voltage from battery 85 to the series connected pressure switches 70, 72 in brake assurance circuit 8 via wire 86 and wire 78. Since deactuation of quick release switch 97 results in actuating pipe 108 being vented, pressure in pipe 92 of quick release pressure switch 70 is also vented, thereby effecting closure of switch 82. This loss of power at microprocessor 2 concurrently causes electro-pneumatic valves 22, 24 in brake pipe control circuit 4 to be de-energized whereby brake pipe pressure is reduced to substantially 0 psi, as hereinbefore explained. Accordingly, the contact 87 of brake pipe pressure switch 72 is also closed, completing a circuit through which battery voltage connected to electro-pneumatic valves 46, 48 by way of wire 88, dropping resistor $R_D$ and wires 90, 91. The dropping resistor $R_D$ reduces the 72-volt battery supply to 24 volts, corresponding to the normal microprocessor supply voltage at which the electro-pneumatic valve solenoid operators are designed to operate. In this manner, electro-pneumatic valves 46, 48 are energized in bypass of microprocessor 2 and thus operate to supply pilot pressure to double check valve 60 via pipe 58.

It will be appreciated that back-up control valve device 110, following a quick release of the brakes, wherein the quick release pilot valve 112 is actuated to effect pressure equalization between chambers 124 and 126, is incapable of producing a reapplication of the brakes during a loss of power condition at microprocessor 2. This is due to the fact that de-energization of electro-pneumatic valves 22, 24 in response to such loss of power at microprocessor 2 results in brake pipe pressure being reduced to substantially 0 psi, thereby effectively disabling back-up control valve device 110. Consequently, pipe 129 leading to double check valve 60 is vented and thus double check valve 60 passes the pilot pressure in pipe 58 to pipe 61 to cause relay valve 62 to effect a reapplication of the brakes under control of brake assurance circuit 8. In accordance with the foregoing, it will be seen that alternately actuating and deactuating quick release switch 97, during a microprocessor loss of power condition, will effect a brake release via quick release circuit 9 and a brake reapplication via brake assurance circuit 8. This will permit a lead locomotive that experiences a microprocessor power failure to be controlled in a manner to bring the train to a safe halt.

We claim:

1. A microprocessor based electro-pneumatic brake control system for a railway train having a brake pipe normally charged to a certain chosen pressure comprising:
    (a) a brake controller having a handle including means for generating a brake command signal in accordance with a selected position of said handle;
    (b) a first brake control circuit having first electro-pneumatic valve means for controlling the pressure of said brake pipe;
    (c) a second brake control circuit electro-pneumatic valve means for controlling the brake cylinder pressure of a locomotive of said railway train;
    (d) microprocessor means having a regulated source of electric power for controlling said first electro-pneumatic valve means in accordance with said brake command signal, and for controlling said second electro-pneumatic valve means in accordance with a change in said brake pipe pressure, said second electro-pneumatic valve means being arranged to supply said locomotive brake pressure in an energized condition thereof and to release said locomotive brake pressure in a de-energized condition thereof;
    (e) brake assurance means for establishing an energized condition of said second electro-pneumatic valve means in response to loss of said regulated source of electric power.

2. A microprocessor based electro-pneumatic brake control system as recited in claim 1, further comprising a main source of electric power from which said regulated source of electric power is derived.

3. A microprocessor based electro-pneumatic brake control system as recited in claim 2, wherein said main source of electric power is a battery.

4. A microprocessor based electro-pneumatic brake control system as recited in claim 2, wherein said brake assurance means comprises a first pressure switch subject to the fluid pressure of said brake pipe and having a normally closed contact via which said main source of electric power is connected to said second electro-pneumatic valve means to establish said energized condition thereof.

5. A microprocessor based electro-pneumatic brake control system as recited in claim 4, wherein said first electro-pneumatic valve means is arranged to exhaust said brake pipe in a de-energized condition.

6. A microprocessor based electro-pneumatic brake control system as recited in claim 5, further comprising quick release means for causing said microprocessor means to effect said de-energized condition of said second electro-pneumatic valve means irrespective of said change in said brake pipe pressure to thereby release said locomotive brake pressure.

7. A microprocessor based electro-pneumatic brake control system as recited in claim 6, wherein said quick release means includes an actuating pipe to which fluid under pressure is connected in response to operation of said quick release means.

8. A microprocessor based electro-pneumatic brake control system as recited in claim 7, wherein said brake assurance means further comprises a second pressure switch subject to the fluid pressure of sdaid actuating pipe and having a normally closed contact connected in series with said normally closed switch of said first pressure switch.

9. A microprocessor based electro-pneumatic brake control system as recited in claim 8, wherein said brake assurance means further comprises an electrical relay connected to said regulated source of electric power and having a normally closed contact connected in series with said normally closed contacts of said first and second pressure switches.

10. A microprocessor based electro-pneumatic brake control system as recited in claim 9, further comprising a dropping resistor in series between said second electro-pneumatic valve means and said series connected normally closed contacts of said first, second, and third pressure switches.

11. A microprocessor based electro-pneumatic brake control system as recited in claim 8, further comprising pneumatic back-up control valve means operative in response to said first electro-pneumatic valve means exhausting said brake pipe fluid under pressure for providing said supply and release of said locomotive brake pressure in parallel with said second electro-pneumatic valve means.

12. A microprocessor based electro-pneumatic brake control system as recited in claim 11, wherein said quick release means further effects operation of said pneumatic back-up control valve to thereby release said locomotive brake pressure.

13. A microprocessor based electro-pneumatic brake control system as recited in claim 12, wherein said pneumatic back-up control means comprises:
    (a) a source of fluid under pressure;
    (b) brake means;
    (c) a control piston having a control chamber and a reference chamber formed on opposite sides thereof, each said chamber being charged to the pressure carried in said brake pipe;
    (d) valve means operable in response to movement of said control piston between a release and an application position;
    (e) said control piston being operable to said application position in response to a reduction of said control chamber pressure relative to said reference chamber pressure, said valve means in said application position of said control piston connecting said source of fluid pressure to said brake means.

14. A microprocessor based electro-pneumatic brake control system as recited in claim 13, wherein said quick release means further effects pressure equalization between said control chamber and said reference chamber.

15. A microprocessor based electro-pneumatic brake control system as recited in claim 14, wherein said quick release means comprises:
    (a) said actuating pipe;

(b) third electro-pneumatic valve means for effecting pressurization of said actuating pipe in an energized condition thereof;
(c) manually operable switch means for effecting said energization of said third electro-pneumatic valve means; and
(d) a piston valve having a release position in which fluid pressure communication is interrupted between said control chamber and said reference chamber and an application position in which said fluid pressure communication is established between said control chamber and said reference chamber to provide said pressure equalization therebetween, said piston valve being movable to said application position in response to pressurization of said actuating pipe.

* * * * *